J. E. MOSEMAN.
VEHICLE CUSHION.
APPLICATION FILED NOV. 30, 1908.
937,628.
Patented Oct. 19, 1909.
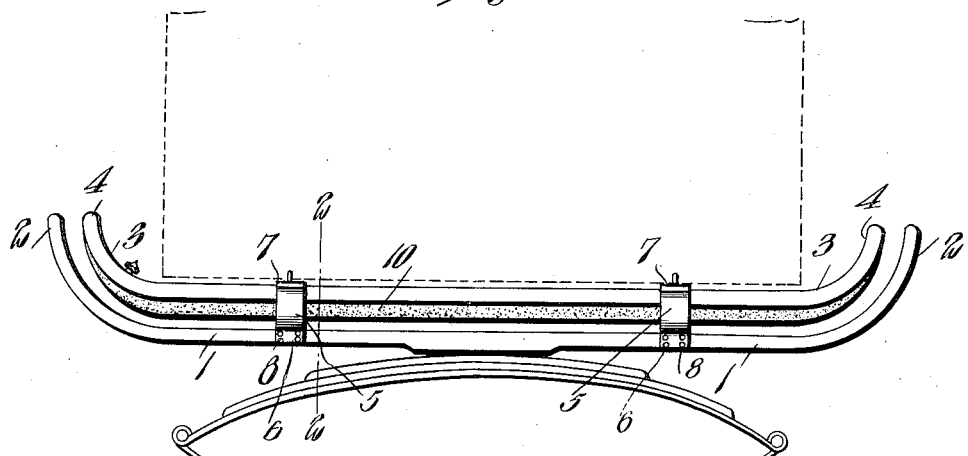
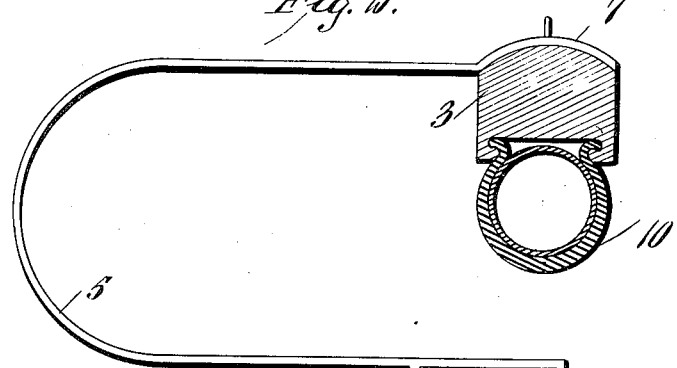
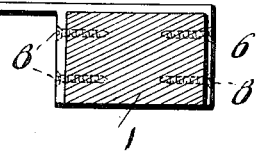
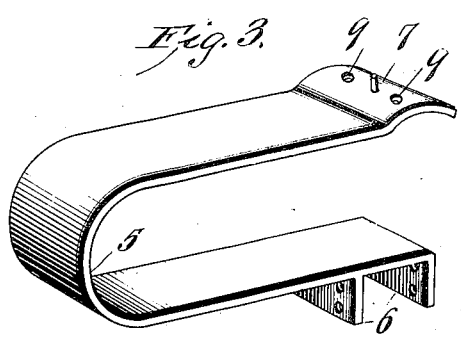
WITNESSES
E. M. Callaghan
A. E. Trainer
INVENTOR
JACOB E. MOSEMAN
BY Munn & Co
ATTORNEYS

UNITED STATES PATENT OFFICE.

JACOB E. MOSEMAN, OF DONALDSONVILLE, LOUISIANA.

VEHICLE-CUSHION.

937,628.  Specification of Letters Patent.  Patented Oct. 19, 1909.

Application filed November 30, 1908. Serial No. 465,012.

*To all whom it may concern:*

Be it known that I, JACOB E. MOSEMAN, a citizen of the United States, and a resident of Donaldsonville, in the parish of Ascension and State of Louisiana, have invented certain new and useful Improvements in Vehicle-Cushions, of which the following is a specification.

My invention is an improvement in vehicle cushions and consists in certain novel constructions and combinations of parts hereinafter described and claimed.

The object of the invention is to provide a device wherein a pneumatic cushion is interposed between the body of the vehicle and the axle.

Referring to the drawings forming a part hereof Figure 1 is a side view of the cushion in position. Fig. 2 is a section on the line 2—2 of Fig. 1, and Fig. 3 is an enlarged perspective view of one of the auxiliary springs.

The present embodiment of the invention comprises a bar 1 of wood, or other suitable material having its ends up-turned as at 2, and which is adapted to be secured to the running gear of the vehicle, and a second bar 3 also having its ends up-turned as at 4, and adapted to be connected with the body of the vehicle. The bars are normally retained in somewhat separated position by an auxiliary spring 5, of U-shape as shown in Figs. 2, and 3, one of the ends of the spring being provided with spaced lugs 6 for receiving between them the bar 1, and the free end of the other arm is provided with an arched portion 7, which rests upon the top of the bar as shown in Fig. 2. The lugs 6 are secured to the bar 1 by screws 8, and the arched portion 7 is secured to the bar 3 by screws 9.

Between the bars 1 and 3, is arranged a rubber casing or cushion 10, adapted to contain air, and secured to the bar 3 in any suitable manner, the casing having a clencher connection with the bar in the embodiment shown.

The auxiliary springs 5 are arranged adjacent to the ends of the bars 1, 3, and are normally adapted to retain the bars in the spaced relation shown in Fig. 2. When however, the bars 1, 3 are moved strongly toward each other as in jarring or jolting, the cushion 10 engages the bar 1 receiving the impact thereof, and absorbing the same.

The bars 1, 3, may be connected with the body and the running gear respectively in any suitable manner, and they may be arranged in any suitable relation with respect to the body, and the running gear, either transversely or longitudinally.

The improved cushion may also be used with railway chairs, the legs of the chair resting upon the upper bar, and the lower bar being secured to the floor.

In ordinary use, the improved cushion would be inserted between the ordinary spring, and the body of the vehicle.

I claim:

The combination with a spring supported carriage, of an auxiliary device arranged between the springs and the body of the vehicle, said device comprising a pair of bars arranged in superposed relation, the lowermost of which is adapted to be connected with the spring and the uppermost to the body of the vehicle, a pneumatic cushion secured to one bar on the face adjacent to the other bar, and U-shaped springs having one arm secured to one bar and the other arm to the other bar and normally retaining said bars in spaced relation.

JACOB E. MOSEMAN.

Witnesses:
 E. J. THOMASSIE,
 R. MELANCON.